US012746926B1

(12) United States Patent
Dugar et al.

(10) Patent No.: US 12,746,926 B1
(45) Date of Patent: Sep. 29, 2026

(54) MIXED-USE VEHICLE REGULATION MODES

(71) Applicant: Samsara Inc., San Francisco, CA (US)

(72) Inventors: Aditi Dugar, Redwood City, CA (US); Abhishyant Khare, San Francisco, CA (US); Zhonghao CHen, Palo Alto, CA (US); Eileen Zhong, Castro Valley, CA (US); Sachie Weber, San Francisco, CA (US); Iching Wang, Oakland, CA (US); Michael Luis Innocenzi, San Francisco, CA (US); Philippe Savoie, Belmont, CA (US); Xin Chen, New York, NY (US)

(73) Assignee: Samsara Inc., San Francisco, CA (US)

( * ) Notice: Subject to any disclaimer, the term of this patent is extended or adjusted under 35 U.S.C. 154(b) by 465 days.

(21) Appl. No.: 17/823,213

(22) Filed: Aug. 30, 2022

Related U.S. Application Data

(60) Provisional application No. 63/369,457, filed on Jul. 26, 2022.

(51) Int. Cl.

| | |
|---|---|
| ***B60W 30/182*** | (2020.01) |
| ***B60W 50/10*** | (2012.01) |
| ***B60W 50/14*** | (2020.01) |
| ***B60W 60/00*** | (2020.01) |

(52) U.S. Cl.
CPC .......... *B60W 30/182* (2013.01); *B60W 50/10* (2013.01); *B60W 50/14* (2013.01); *B60W 60/001* (2020.02); *B60W 2530/10* (2013.01); *B60W 2540/049* (2020.02); *B60W 2556/00* (2020.02)

(58) Field of Classification Search
None
See application file for complete search history.

(56) References Cited

U.S. PATENT DOCUMENTS

| | | | | |
|---|---|---|---|---|
| 2018/0308295 | A1* | 10/2018 | Kwak | G06F 9/453 |
| 2018/0324555 | A1* | 11/2018 | Diem | H04W 4/024 |
| 2019/0295333 | A1* | 9/2019 | Nista | G06K 19/07749 |
| 2021/0114432 | A1* | 4/2021 | Rodoni | B60W 50/14 |
| 2022/0063619 | A1* | 3/2022 | Maniwa | B60W 30/182 |
| 2022/0405691 | A1* | 12/2022 | Nilmeier | G06Q 10/063114 |

* cited by examiner

*Primary Examiner* — Navid Z. Mehdizadeh
*Assistant Examiner* — Jason R Roberson
(74) *Attorney, Agent, or Firm* — Schwegman Lundberg & Woessner, P.A.

(57) ABSTRACT

Disclosed are systems, methods, and non-transitory computer-readable media for operating a vehicle with a mixed-use setting. A route management system provides for determining that a mixed-use setting has been enabled for a vehicle, the mixed-use setting allowing the vehicle to operate in one of two vehicle regulation modes comprising a first vehicle regulation mode and a second vehicle regulation mode; detecting a condition associating with switching between the two vehicle regulation modes of the vehicle; in response to detecting the condition, switching from operating the vehicle in the first vehicle regulation mode to operating the vehicle in the second vehicle regulation mode; and storing an annotation representing the condition for switching from operating the vehicle in the first vehicle regulation mode to operating the vehicle in the second vehicle regulation mode.

19 Claims, 9 Drawing Sheets

MIXED-USE VEHICLE REGULATION MODES

PRIORITY APPLICATION

This application claims priority to U.S. Provisional Patent Application Ser. No. 63/369,457, filed on Jul. 26, 2022, the disclosure of which is incorporated by reference herein in its entirety

TECHNICAL FIELD

Embodiments of the present subject matter relate generally to vehicles and, more specifically, to vehicles operating in different vehicle regulation modes.

BACKGROUND

Fleet managers track the movement of their vehicles to ensure that they are operating as expected. For example, fleet managers may track whether a vehicle began a route at an expected time, arrived at scheduled stops along the route, and completed the route. This process is often performed manually; however, systems have been developed to automate this process. These systems utilize geofences to determine when a vehicle has arrived and/or departed a scheduled stop. In some cases, a vehicle may be scheduled to stop at multiple locations that are within a proximity of each other. For example, a delivery truck may be scheduled to deliver packages at multiple stores located in the same shopping center.

BRIEF DESCRIPTION OF THE DRAWINGS

To easily identify the discussion of any particular element or act, the most significant digit or digits in a reference number refer to the figure number in which that element is first introduced.

DETAILED DESCRIPTION

Figure 1:
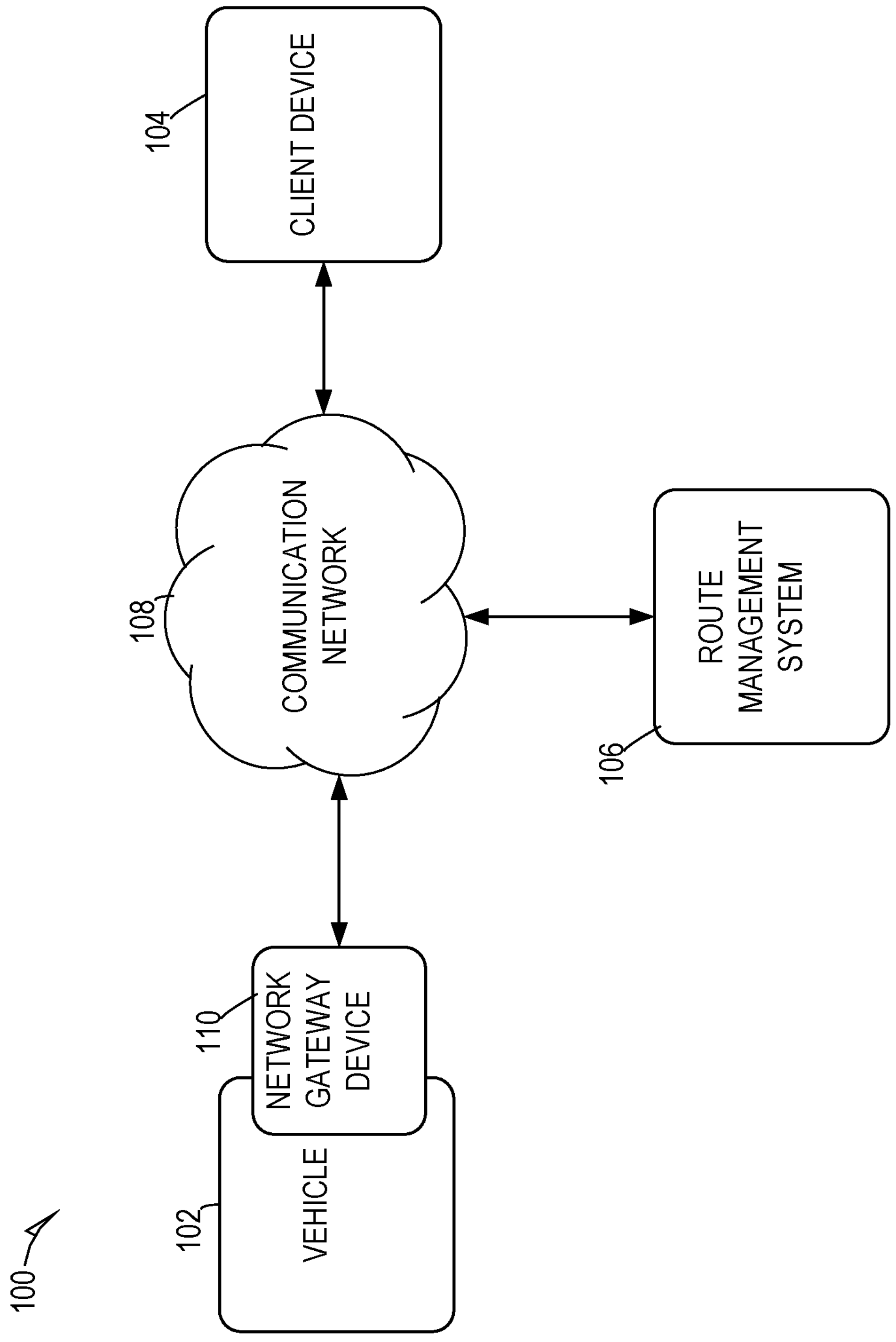
FIG. 1 shows a system for operating a vehicle in one of multiple vehicle regulation modes, according to some example embodiments.

In the following description, for purposes of explanation, various details are set forth in order to provide a thorough understanding of some example embodiments. It will be apparent, however, to one skilled in the art, that the present subject matter may be practiced without these specific details, or with slight alterations. Reference in the specification to "one embodiment" or "an embodiment" means that a particular feature, structure, or characteristic described in connection with the embodiment is included in at least one embodiment of the present subject matter. Thus, the appearances of the phrase "in one embodiment" or "in an embodiment" appearing in various places throughout the specification are not necessarily all referring to the same embodiment and the embodiments can be combined with each other.

For purposes of explanation, specific configurations and details are set forth in order to provide a thorough understanding of the present subject matter. However, it will be apparent to one of ordinary skill in the art that embodiments of the subject matter described may be practiced without the specific details presented herein, or in various combinations, as described herein. Furthermore, well-known features may be omitted or simplified in order not to obscure the described embodiments. Various examples may be given throughout this description. These are merely descriptions of specific embodiments. The scope or meaning of the claims is not limited to the examples given.

Disclosed are systems, methods, and non-transitory computer-readable media for operating a vehicle with a mixed-use setting. A route management system provides for manually or automatically switching between vehicle regulation modes, such as a regulated operating mode and an unregulated operating mode. For example, the route management system enables fleet managers to define and assign mixed-used settings for certain vehicles in a fleet that navigate along one or more routes. A route may be defined based on a set of route variables that describe the route. For example, the set of route variables may include a beginning and ending location of the route, scheduled stops along the route each associated with a geographical location, an order at which the vehicle is to stop at each scheduled stop, a scheduled beginning and ending time of the route, a scheduled arrival and departure time at the scheduled stops, the amount of time the vehicle remains stopped at an individual stop or location, and the like. In some cases, drivers can pick and choose which routes the drivers would like to drive and in other cases the order of the routes is determined by the fleet manager. Some routes are associated with regulated vehicles, and, for such routes, the vehicle may be switched into a regulated vehicle regulation mode. Other routes are not associated with any regulation status, and, for such routes, the vehicle may be switched into an unregulated vehicle regulation mode or regulated vehicle regulation mode depending on one or more other factors.

The route management system uses the set of route variables defining each route along with sensor data describing the geographic location and/or movement of the vehicles to generate route tracking reports. The route tracking reports can be generated based on electronic logging device (ELD) data associated with certain vehicles. A route tracking report is a file or document that includes the ELD data indicating the movement of a vehicle in relation to its assigned route. For example, the route tracking report may indicate whether a vehicle began and/or ended its route on time, arrived at each of its scheduled stops, arrived and/or departed from each scheduled stop on time, completion status of each stop (e.g., whether the stops are in a completed state or incomplete state), completed the route in the correct order, the list of stops and their associated locations remaining on the route, the amount of time the vehicle was driven in a regulated or unregulated vehicle regulation mode, hours of service of the driver, and the like.

As referred to herein, a regulated vehicle (or vehicle operating in a regulated vehicle regulation mode) means that the operation of the vehicle necessitates the driver to follow certain hours of service (HOS) rules among other rules associated with different routes, regions, governmental entities, and so forth. In a regulated vehicle, the driver can be subject to limits on the total drive time and shift time in a day. To follow the HOS rules, vehicles are equipped with ELD which automatically logs drive time when the vehicle is in motion. Operation of a regulated vehicle without a driver associated can generate unassigned drive segments which may need to be attributed to a driver manually, such as by manual annotation or re-assignment.

As referred to herein, an unregulated vehicle (or vehicle operating in an unregulated vehicle regulation mode) means that the operation of the vehicle is exempt from following HOS rules and/or other rules associated with different routes, regions, governmental entities, and so forth. For such unregulated vehicles, the drive time can be logged as on duty if the driver also operates regulated vehicles. Operating an unregulated vehicle may be the same as performing any non-driving activity for the day and operation of the vehicle may not be tracked by the ELD. There may be no limit on the amount of time the unregulated vehicle is driven in a day and there may be no unassigned drive segments generated when the vehicle is in motion without an associated driver.

In some cases, an unregulated vehicle may need to be operated as a regulated vehicle when certain conditions are met. For example, vehicles may need to be operated as regulated vehicles if their associated weight transgresses a specified weight threshold, if they carry certain cargo, and/or if the quantity of passengers (e.g., passenger count) transgresses a certain threshold. Knowing when to switch between regulated and unregulated modes can be cumbersome on drivers. Often drivers may not even be aware of the circumstances that arise that require the vehicle to be operated in the regulated mode. For example, a driver may drive into a certain region that is associated with a set of rules unfamiliar to the driver which may require the vehicle to be operated in the regulated mode. Failing to operate the vehicle in the regulated mode in such circumstances, can lead to violations. This makes compliance with rules difficult and cumbersome on drivers. As a result, vehicles may continuously be operated in the regulated mode or unregulated mode to avoid violating the rules.

There is no seamless and straightforward mechanism for drivers to switch between vehicle regulation modes or for automatically allowing vehicles to switch between vehicle regulation modes. To switch modes, drivers typically need to be aware of the rules and regulations and know when to manually navigate through multiple pages of information to modify the system configuration to operating in different vehicle regulation modes to begin or stop an ELD from collecting data. This ends up frustrating the drivers and the drivers may be discouraged from driving or navigating routes in an efficient manner. Also, drivers that do navigate through the multiple pages of information to navigate other routes waste system resources that can be dedicated to other tasks.

To alleviate this issue, the route management system provides for a graphical user interface (GUI) that simplifies navigation through vehicle regulation modes to seamlessly switch between vehicle regulation modes when certain conditions are met or satisfied. For example, the route management system provides for determining that a mixed-use setting has been enabled for a vehicle, the mixed-use setting allowing the vehicle to operate in one of two vehicle regulation modes including a first vehicle regulation mode and a second vehicle regulation mode. The route management system detects a condition associating with switching between the two vehicle regulation modes of the vehicle. The route management system, in response to detecting the condition, switches from operating the vehicle in the first vehicle regulation mode to operating the vehicle in the second vehicle regulation mode (e.g., from operating in an unregulated vehicle regulation mode to a regulated vehicle regulation mode or vice versa). The route management system stores an annotation representing the condition for switching from operating the vehicle in the first vehicle regulation mode to operating the vehicle in the second vehicle regulation mode.

By providing an easy-to-use GUI for manually or automatically switching between vehicle regulation modes, drivers are better equipped to manage their deliveries and personal time, and comply with rules and regulations. Also, the number of pages of information that a driver needs to navigate through is reduced, which makes operating the system more efficient and reduces the amount of resources needed to accomplish a task. Specifically, the disclosed systems improve a driver's experience by providing them more flexibility into which vehicle regulation mode is being used to drive and track the driver's time. This can improve the operational efficiency of the route management system by reducing call volumes between drivers and dispatchers requesting changes to the vehicle regulation mode, thus alleviating the dispatchers' burden, and enabling them to handle other tasks.

FIG. 1 shows a system 100 for manually starting assigned routes. As shown, multiple devices (i.e., vehicle 102, client device 104, and route management system 106) are connected to a communication network 108 and configured to communicate with each other through use of the communication network 108. The communication network 108 is any type of network, including a local area network (LAN), such as an intranet, a wide area network (WAN), such as the internet, a telephone and mobile device network, such as cellular network, or any combination thereof. Further, the communication network 108 may be a public network, a private network, or a combination thereof. The communication network 108 is implemented using any number of communication links associated with one or more service providers, including one or more wired communication links, one or more wireless communication links, or any combination thereof. Additionally, the communication network 108 is configured to support the transmission of data formatted using any number of protocols.

Multiple computing devices can be connected to the communication network 108. A computing device is any type of general computing device capable of network communication with other computing devices. For example, a computing device can be a personal computing device such as a desktop or workstation, a business server, a wearable device, a watch, or a portable computing device, such as a laptop, smart phone, or a tablet personal computer (PC). A computing device can include some or all of the features, components, and peripherals of the machine 900 shown in FIG. 9.

To facilitate communication with other computing devices, a computing device includes a communication interface configured to receive a communication, such as a request, data, and the like, from another computing device in network communication with the computing device and pass the communication along to an appropriate module running on the computing device. The communication interface also sends a communication to another computing device in network communication with the computing device.

The vehicle 102 may be any type of vehicle, such as an automobile, bicycle, motorcycle, skateboard, semi-trailer truck, plane, bus, train, ship, a vessel, and the like. As shown, the vehicle 102 includes a network gateway device 110 (e.g., vehicle gateway) that allows for remote communication between the vehicle 102 and one or more remote computing devices via the communication network 108.

The network gateway device 110 is a hardware device that acts as a gate to a network and enables traffic to flow in and out of the network to other networks. For example, the network gateway device 110 can be established as an edge device of a network or system of nodes within the vehicle 102 (e.g., vehicle networking system). For example, the network or system of nodes may include a variety of sensors, computing devices (e.g., electronic control units (ECUs)), actuators, etc. deployed within the vehicle 102. The network gateway device 110 facilitates wireless communication capabilities by connecting to wireless networks (e.g., cellular, wireless local area network, satellite communication networks, etc.), for purposes of communicating with remote computing devices. The network gateway device 110 may also provide additional functionality, such as firewall functionality by filtering inbound and outbound communications, disallowing incoming communications from suspicious or unauthorized sources, etc.

Use of the network gateway device 110 allows for a remote computing device to transmit data and/or commands to the vehicle 102. Similarly, the network gateway device 110 allows for the vehicle 102 to transmit data, such as sensor data gathered by sensors of the vehicle 102, to a remote computing device. The vehicle 102 may be equipped with a variety of sensors that capture ELD data describing performance of a vehicle 102 and its surroundings. For example, the sensors may include engine speed sensors, fuel temperature sensors, voltage sensors, pressure sensors, radar sensors, location sensors, global positioning system (GPS) sensors that provide a current geographical location of the vehicle 102, light detection and ranking (LIDAR) sensors, imaging sensors (e.g., camera, video camera), and the like.

The route management system 106 is one or more computing devices that allow for generation and management of routes as well as automated route tracking. For example, the route management system 106 may allow administrators to generate routes and assign the generated routes to vehicles 102. The route management system 106 may also provide automated route tracking of the vehicles 102 based on the assigned routes. The route management system 106 may also enable operators, route managers, and drivers to access and view assigned past, present, and future routes. In some cases, the route management system 106 can determine whether the vehicle 102 is in a certain region or on a certain road that is associated with regulated vehicle operating mode. In such cases, the route management system 106 can instruct the vehicle 102 (and/or ELD) to switch vehicle regulation modes to the regulated vehicle regulation mode and begin storing data from the ELD. The route management system 106 can annotate the data stored from the ELD with the reason for switching, such as the identification of the region or road that is associated with the regulated vehicle operating mode.

To utilize the functionality of the route management system 106, users (e.g., fleet managers, drivers, or operators) may use a client device 104 that is connected to the communication network 108 by direct and/or indirect communication. Although the shown system 100 includes only one client device 104 and one vehicle 102, this is only for ease of explanation and is not meant to be limiting. One skilled in the art would appreciate that the system 100 can include any number of client devices 104 and/or vehicles 102. Further, the route management system 106 may concurrently accept communications from and initiate communication messages and/or interact with any number of client devices 104 and vehicles 102, and support connections from a variety of different types of client devices 104, such as desktop computers; mobile computers; mobile communications devices, e.g., mobile phones, smart phones, wearables, watches, glasses, tablets; smart televisions; set-top boxes; and/or any other network enabled computing devices. Hence, the client devices 104 may be of varying type, capabilities, operating systems, and so forth.

A user interacts with a route management system 106 via a client-side application installed on the client device 104. In some embodiments, the client-side application includes a component specific to the route management system 106. For example, the component may be a stand-alone application, one or more application plug-ins, and/or a browser extension. However, the users may also interact with the route management system 106 via a third-party application, such as a web browser or messaging application, that resides on the client device 104 and is configured to communicate with the route management system 106. In either case, the client-side application presents a user interface (UI) or GUI for the user to interact with the route management system 106. For example, the user interacts with the route management system 106 via a client-side application integrated with the file system or via a webpage displayed using a web browser application.

The UI of the client-side application can allow an end user to switch between various vehicle regulation modes. For example, the UI can present a current vehicle regulation mode to a user. The UI can detect a condition for switching between vehicle regulation modes. For example, the UI can receive input from the user that selects the current vehicle regulation mode. As another example, the UI can collect vehicle information (e.g., a current weight, a count of the number of passengers, a type of cargo being carried, and so forth). Based on a determination that the vehicle information corresponds to a one or more criteria for switching between vehicle regulation modes, the UI can automatically switch from a first mode to a second mode and/or can prompt a user to accept a recommendation to switch from the first vehicle regulation mode to the second vehicle regulation mode. In some cases, in response to receiving input that selects the current vehicle regulation mode, the UI can present an hours of service (HOS) interface that lists the HOS currently available for the end user (e.g., the driver). The UI can receive input that taps or selects an option to switch operating modes. In response, the UI can instruct the client device 104 and the vehicle 102 to switch from a first vehicle regulation mode (e.g., an unregulated mode) to a second vehicle regulation mode (e.g., a regulated mode).

In some examples, when the second vehicle regulation mode is activated or used (e.g., the regulated mode), the vehicle 102 and/or the client device 104 activates an ELD device to begin automatically collecting data. This data is stored together with an annotation that specifies a reason for switching vehicle regulation modes. In some cases, the annotation is requested to be input by the user, such as via a prompt presented in response to receiving the input requesting to switch vehicle regulation modes. In some cases, the annotation is automatically determined and populated.

As discussed earlier, the route management system 106 enables fleet managers to generate and track vehicle routes. For example, the route management system 106 may provide a UI that allows fleet managers to generate vehicle routes. A vehicle route is a route to be traversed by a vehicle 102 that is defined by a set of route variables. For example, the set of route variables may include a beginning and ending geographic location of the route, scheduled geographic stops along the route, geographical locations of such stops or destinations, geofences associated with each stop or destination, scheduled amount of time to be spent at each stop before departing to a subsequent stop or destination, an order at which the vehicle 102 is to stop at each scheduled stop, a scheduled beginning and ending time of the route, a scheduled arrival and departure time at the scheduled stops, and the like.

In some examples, a vehicle 102 can be provided multiple routes each including a respective set of route variables. The multiple routes may include some of the same stops or destinations (e.g., stops or destinations may overlap between routes), or the multiple routes may include exclusively unique stops or destinations. A vehicle 102 may only traverse one route at a time. Namely, the vehicle 102 can drive along a selected route to each stop of the selected route and such stops are tracked for the selected route. Stops of other routes that have not been selected may not be tracked while the vehicle is navigating or driving along a selected route. For example, if two routes include a same particular stop or destination (e.g., include two stops with overlapping geofences), when the vehicle 102 reaches or crosses a geofence of the particular stop or destination associated with a first of the routes which is currently an active route (e.g., because the route was selected for navigation), the particular stop or destination is marked completed in association with the first of the routes but remains incomplete or scheduled in association with a second of the two routes.

The UI provided by the route management system 106 enables fleet managers to select the set of route variables to define a route. For example, the UI may provide a listing of geographic locations and times that a fleet manager may select from to define a route. A fleet manager may use the UI to select geographic locations to be included in the route, such as a beginning location, end location, geographical locations of such stops or destinations, geofences associated with each stop or destination, scheduled amount of time to be spent at each stop before departing to a subsequent stop or destination, and scheduled stops, as well as select an order in which the geographic locations are to be traversed along the route. The UI may also enable a fleet manager to assign times to the selected geographic locations, such as scheduled start time, arrival time, and/or departure time for each. The UI may also enable the fleet manager to select which route is currently active and which are inactive for a particular vehicle 102. The UI may also provide notifications or alerts associated with an active route indicating stops along the route and/or whether a vehicle 102 is early or late with respect to the scheduled arrival/departure time of one or more stops.

The UI may also enable fleet managers to assign the generated routes to individual vehicles 102 and/or vehicle operators or drivers. For example, the user interface may present a listing of individual vehicles 102 and/or vehicle operators from which the fleet manager may select. As another example, the UI may enable an administrator to enter data identifying a vehicle 102 or vehicle operator, as well as enter a new vehicle 102 or vehicle operator.

The UI can also enable fleet managers (e.g., administrators) to select which drivers, users, and/or vehicles 102 are enabled for mixed-use vehicle regulation modes. For example, the UI can present a list of vehicles, users, and drivers to the fleet manager. The UI can receive input from the fleet manager that selects a particular driver, user, and/or vehicle 102. In response to receiving the input, the UI presents an option to enable a mixed-use setting. Any vehicle 102 or driver for which the mixed-use setting has been enabled can allow the driver and/or vehicle 102 to switch from operating manually or automatically in one vehicle regulation mode to another vehicle regulation mode. If a vehicle 102 or driver is not associated with an enabled mixed-use setting, the vehicle 102 can, by default, be in a particular vehicle regulation mode permanently or until an authorization is received from the fleet manager to switch modes.

The route management system 106 provides for automated tracking of the vehicles 102 based on the routes assigned by the fleet manager. For example, the route management system 106 receives sensor data describing the current location and/or motion of the vehicle 102, which the route management system 106 uses to track location of the vehicle 102 and to compute/update estimated times of arrival (ETAs) of stops along the route. As referred to herein, the terms "stop," "destination," and "location" may be used interchangeably and may have the same meaning. The sensor data may be received from the vehicle 102 and/or from a client device 104 of the vehicle operator in real time or periodically.

The route management system 106 uses the set of route variables defining a route along with the sensor data describing the geographic location and/or movement of the vehicle 102 to generate a route tracking report describing the tracked movement of the vehicle 102 in relation to its assigned route. For example, the route tracking report may indicate whether the vehicle 102 began and/or ended its route on time, arrived at each of its scheduled stops, arrived and/or departed from each scheduled stop on time, completed the route in the correct order, and the like. The route tracking report may include some or all of the information of the route including the route variables.

In some examples, the route tracking report can include historical, current, and future route information. Namely, the route tracking report can include information that identifies a list of routes previously assigned and completed or partially completed by a driver. The route tracking report can include currently assigned routes that are actively being driven and/or completed. The route tracking report can include routes assigned in the future to be driven at a future date. Such routes can include updates or changes which are tracked and stored by the route tracking report. The route tracking report can include ELD data for each vehicle 102 and/or driver that specifies the HOS and various other parameters of the vehicle 102 and/or driver. In some cases, the route tracking report can specify whether a request was received to switch from one vehicle regulation mode manually or automatically to another vehicle regulation mode. In such cases, the route tracking report can include one or more annotations for each group of ELD data associated with a switch between vehicle regulation modes that specifies the reason for switching.

The route management system 106 uses geofences to determine when vehicles 102 have arrived and/or departed from scheduled stops along a route. A geofence is a virtual perimeter for a real-world geographic area. Geofences are established to encompass each scheduled stop along a route.

The route management system 106 uses the geofences along with location data describing the current location of the vehicles 102 to determine whether the vehicles 102 have arrived and/or departed the scheduled stops. For example, the route management system 106 may determine that a vehicle 102 has arrived at a scheduled stop if the current location of the vehicle 102 has been within the geofence encompassing the scheduled stop for a threshold period of time. In such cases, the route management system 106 may mark or set the corresponding stop to a completed state. Similarly, the route management system 106 may determine that the vehicle 102 has departed the scheduled stop if the current location of the vehicle 102 is subsequently outside of the geofence, encompassing the scheduled stop for another threshold period of time. The stops along a route can be navigated to sequentially or in any arbitrary order. Regardless of the order in which the stops are navigated to, the route management system 106 automatically sets a given stop of a given route to a completed state in response to determining that the given route is in the active route state and that the current location of the vehicle is within the geofence associated with the given stop.

In some examples, certain geofences can be associated with a regulated vehicle operating mode. In such cases, when the vehicle 102 enters such geofences, the vehicle 102 can present a prompt allowing the driver to manually switch to the regulated vehicle operating mode if the current vehicle regulation mode is the unregulated vehicle operating mode. In some cases, the vehicle 102 can automatically switch to the regulated vehicle regulation mode when entering such geofences. When the vehicle 102 leaves the geofences, the vehicle 102 can automatically (or in response to input from a user) return to the previous vehicle regulation mode that was active before the vehicle 102 entered the geofence.

Figure 2:
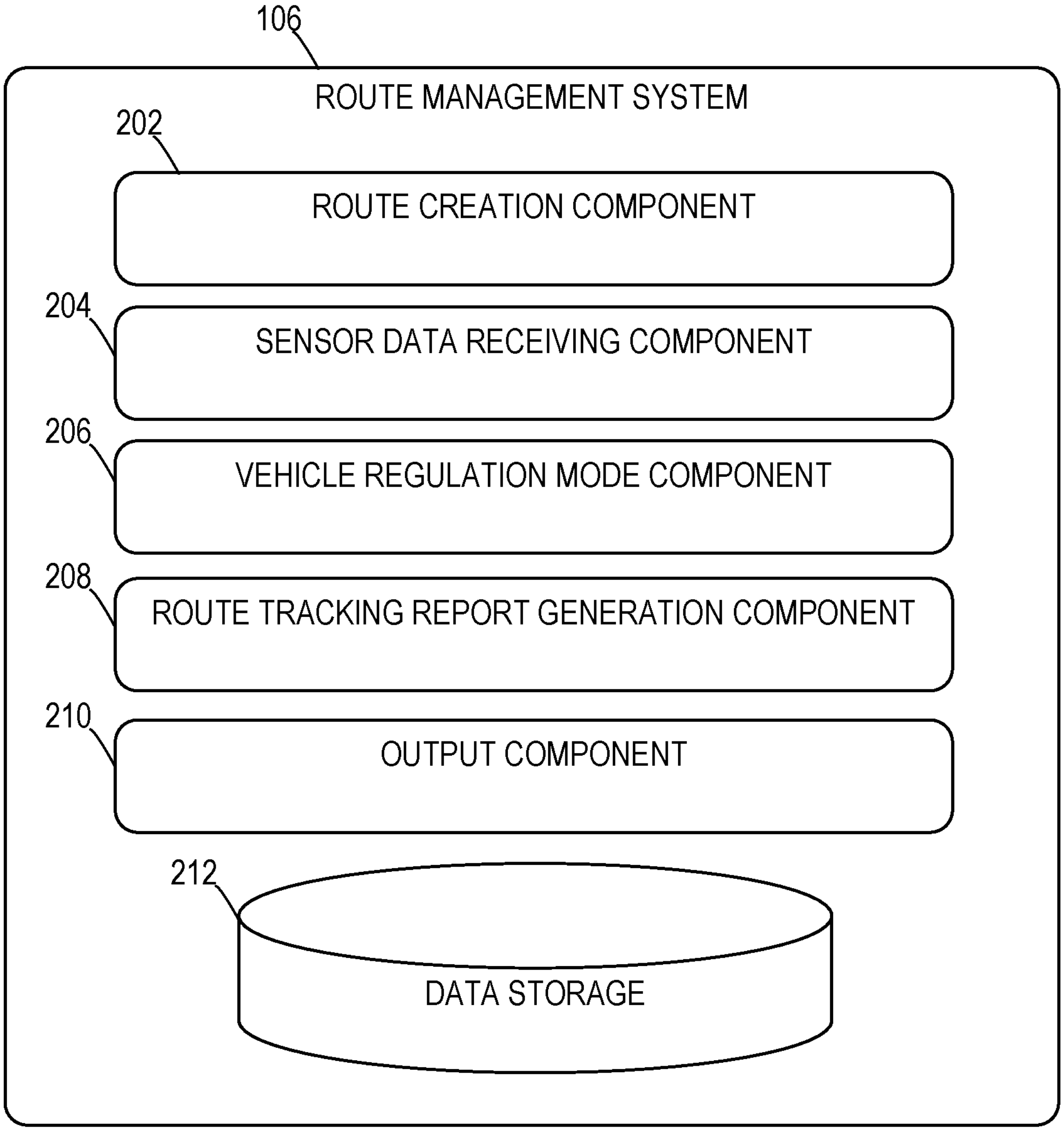
FIG. 2 is a block diagram of the route management system, according to some example embodiments.

FIG. 2 is a block diagram of the route management system 106 of FIG. 1, according to some example embodiments. To avoid obscuring the inventive subject matter with unnecessary detail, various functional components (e.g., modules) that are not germane to conveying an understanding of the inventive subject matter have been omitted from FIG. 2. However, a skilled artisan will readily recognize that various additional functional components may be supported by the route management system 106 to facilitate additional functionality that is not specifically described herein. Furthermore, the various functional components depicted in FIG. 2 may reside on a single computing device or may be distributed across several computing devices in various arrangements such as those used in cloud-based architectures.

As shown, the route management system 106 includes a route creation component 202, a sensor data receiving component 204, a vehicle regulation mode component 206, a route tracking report generation component 208, an output component 210, and a data storage 212.

The route creation component 202 enables fleet managers to generate routes and assign routes to vehicles 102 of FIG. 1. For example, the route creation component 202 may provide a UI that allows fleet managers to generate vehicle routes. A vehicle route is a route to be traversed by a vehicle 102 that is defined by a set of route variables, discussed above. For example, the set of route variables may include a beginning and ending geographic location of the route, scheduled geographic stops along the route, an order at which the vehicle 102 is to stop at each scheduled stop, a scheduled beginning and ending time of the route, a scheduled arrival and departure time at the scheduled stops, and the like. The route variables may also include geographical locations of such stops or destinations, geofences associated with each stop or destination, and/or scheduled amounts of time to be spent at each stop before departing to a subsequent stop or destination. The route variables may be stored as part of a route tracking report in data storage 212. The route creation component 202 can also allow fleet managers to designate or enable mixed-use settings for certain vehicles 102, drivers, and/or users.

The UI provided by the route creation component 202 enables fleet managers to select the set of route variables for a route. For example, the UI may provide a listing of geographic locations and times that a fleet manager may select from to define a route. A fleet manager may use the UI to select geographic locations to be included in the route, such as a beginning location, end location, and scheduled stops, as well as select an order in which the geographic locations are to be traversed along the route. The UI may also enable a fleet manager to assign times to the selected geographic locations, such as scheduled start time, arrival time, and/or departure time for each. The UI may also enable the fleet managers to specify geographical locations of such stops or destinations, geofences associated with each stop or destination, and/or scheduled amount of time to be spent at each stop before departing to a subsequent stop or destination.

The UI may also enable fleet managers to assign the generated routes to individual vehicles 102 and/or vehicle operators or drivers. For example, the user interface may present a listing of individual vehicles 102 and/or vehicle operators from which the fleet manager may select. As another example, the user interface may enable an administrator to enter data identifying a vehicle 102 or vehicle operator, as well as enter a new vehicle 102 or vehicle operator. The UI may also enable the fleet managers to specify which of a set of routes assigned to a given vehicle 102 is currently active and being tracked. In some examples, the UI can be presented to a driver to enable the driver to manually select which routes are currently active and/or to switch from one route being in the active state to another route being in the active state from a scheduled state. Tracking a route includes determining whether stops along the route have been completed or are scheduled for arrival. Stops that are being tracked can be used to generate ETAs of the corresponding stops.

As referred to herein, routes that are in the active state have their associated stops tracked for completion, such that when a geofence of a given one of the stops is broken or reached by the current location of the vehicle, the stop is marked or set to a completed state. Routes that are in the inactive, completed, or scheduled state do not currently have their stops tracked. In such cases, when the geofence of such routes is broken or reached by the current location of the vehicle, the corresponding stop remains in the scheduled, completed, skipped, or inactive state. In some examples, only one route at a time can be in the active state. In some examples, multiple routes can be in the active state simultaneously.

The route creation component 202 stores data defining the created routes in the data storage 212, where it can be accessed by other components of the route management system 106. For example, the data stored in the data storage 212 may be associated with an account of the route management system 106 and/or specific vehicles 102 to which the route has been assigned.

The sensor data receiving component 204 can include an ELD and/or communicate with an ELD of certain vehicles 102 to receive sensor data used to provide automated route tracking. For example, the sensor data receiving component

204 receives sensor data describing the current location and/or motion of a vehicle 102. The sensor data may be received from the vehicle 102 and/or from a client device 104 of the vehicle operator that is operating the vehicle 102.

The route tracking report generation component 208 generates a route tracking report for access by the vehicle regulation mode component 206. The route tracking report describes the tracked movement of the vehicle 102 in relation to its assigned route. For example, the route tracking report may indicate whether the vehicle 102 began and/or ended its route on time, arrived at each of its scheduled stops, arrived and/or departed from each scheduled stop on time, completed the route in the correct order, and the like. The route tracking report may include information on routes tracked in the past for a vehicle 102, routes currently assigned to the vehicle 102, and routes assigned to the vehicle to be driven in the future. In some examples, the route tracking report includes route information for up to 30 days in the past and 30 days in the future, although other suitable time periods can be used.

The vehicle regulation mode component 206 determines, by a route management system, that a mixed-use setting has been enabled for a vehicle 102, the mixed-use setting allowing the vehicle to operate in one of two vehicle regulation modes comprising a first vehicle regulation mode and a second vehicle regulation mode. The vehicle regulation mode component 206 detects a condition associating with switching between the two vehicle regulation modes of the vehicle. The vehicle regulation mode component 206 in response to detecting the condition, switches from operating the vehicle 102 in the first vehicle regulation mode to operating the vehicle 102 in the second vehicle regulation mode. The vehicle regulation mode component 206 stores an annotation representing the condition for switching from operating the vehicle 102 in the first vehicle regulation mode to operating the vehicle in the second vehicle regulation mode.

In some examples, the first vehicle regulation mode includes an unregulated mode of operation, and the second vehicle regulation mode includes a regulated mode of operation. In some examples, the second vehicle regulation mode includes an unregulated mode of operation, and the first vehicle regulation mode includes a regulated mode of operation.

In some examples, the vehicle regulation mode component 206 detects the condition by receiving input from a driver that requests to switch from the first vehicle regulation mode to the second vehicle regulation mode. In response to receiving the input from the driver, the vehicle regulation mode component 206 presents a prompt requesting additional input from the driver corresponding to a reason for switching between the two vehicle regulation modes. The vehicle regulation mode component 206 generates the annotation based on the additional input.

In some examples, the vehicle regulation mode component 206 presents a graphical user interface (GUI) to a driver, the GUI representing the one of the two vehicle regulation modes that is in current operation by the vehicle.

In some examples, the vehicle regulation mode component 206 detects the condition by determining that a driver has signed out of the route management system. The vehicle 102 can be automatically switched to operating in the first vehicle regulation mode in response to determining that the driver has signed out of the route management system. For example, the first vehicle regulation mode includes an unregulated mode of operation to which the vehicle regulation mode component 206 automatically switches.

In some examples, the vehicle regulation mode component 206 automatically activates an ELD in response to switching from operating the vehicle in the first vehicle regulation mode to operating the vehicle in the second vehicle regulation mode.

In some examples, the vehicle regulation mode component 206 accesses data associated with the vehicle. The vehicle regulation mode component 206 determines that the data satisfies one or more criteria. The vehicle regulation mode component 206 detects the condition in response to determining that the data satisfies one or more criteria. For example, the data represents a current passenger count of the vehicle. In such cases, the vehicle regulation mode component 206 compares the current passenger count to a passenger count threshold and determines that the data satisfies the one or more criteria in response to determining that the current passenger count transgresses the passenger count threshold. As another example, the data represents a current weight of the vehicle. In such cases, the vehicle regulation mode component 206 compares the current weight of the vehicle to a vehicle weight threshold and determines that the data satisfies the one or more criteria in response to determining that the current weight of the vehicle transgresses the vehicle weight threshold. As another example, the data represents a cargo type of the vehicle 102. In such cases, the vehicle regulation mode component 206 determines that the data satisfies the one or more criteria in response to determining that the cargo type of the vehicle corresponds to restricted cargo types (e.g., hazardous materials).

In some examples, the vehicle regulation mode component 206 automatically storing ELD data in response to switching from operating the vehicle in the first vehicle regulation mode to operating the vehicle in the second vehicle regulation mode. After switching from operating the vehicle in the first vehicle regulation mode to operating the vehicle in the second vehicle regulation mode, the vehicle regulation mode component 206 switches (manually or automatically) from operating the vehicle in the second vehicle regulation mode to operating the vehicle again in the first vehicle regulation mode. In such cases, the data from the ELD stops being stored in response to switching from operating the vehicle in the second vehicle regulation mode to operating the vehicle in the first vehicle regulation mode. The annotation can be stored together with the ELD data. In such cases, the vehicle regulation mode component 206 generates an activity log representing times when the vehicle regulation mode has been switched.

In some examples, the vehicle regulation mode component 206 receives input from an administrator that enables the mixed-use setting for the vehicle via a graphical user interface presented to the administrator (e.g., a fleet manager).

The output component 210 provides the route tracking report to a fleet manager or other user. For example, the output component 210 may transmit the route tracking report to the client device 104 of a fleet manager or other user via email, text message, and the like. As another example, the output component 210 may provide the route tracking report within a user interface that can be accessed by a fleet manager. For example, a fleet manager may use a client device 104 to interact with the route management system 106 and to access the user interface provided by the output component 210.

The output component 210 may also transmit notifications based on the data included in a route tracking report. For example, the output component 210 may transmit a notification to a client device 104 of a vehicle operator indicating that the vehicle operator has missed a scheduled stop, is behind schedule, is not following the correct route, and the like. Similarly, the output component 210 may transmit a notification to a client device 104 of a fleet manager or other user to provide status updates associated with a route, such as the vehicle 102 having started at a route, arriving at a scheduled stop, left a scheduled stop, missed a scheduled stop, completed the route, and the like.

Figure 3:
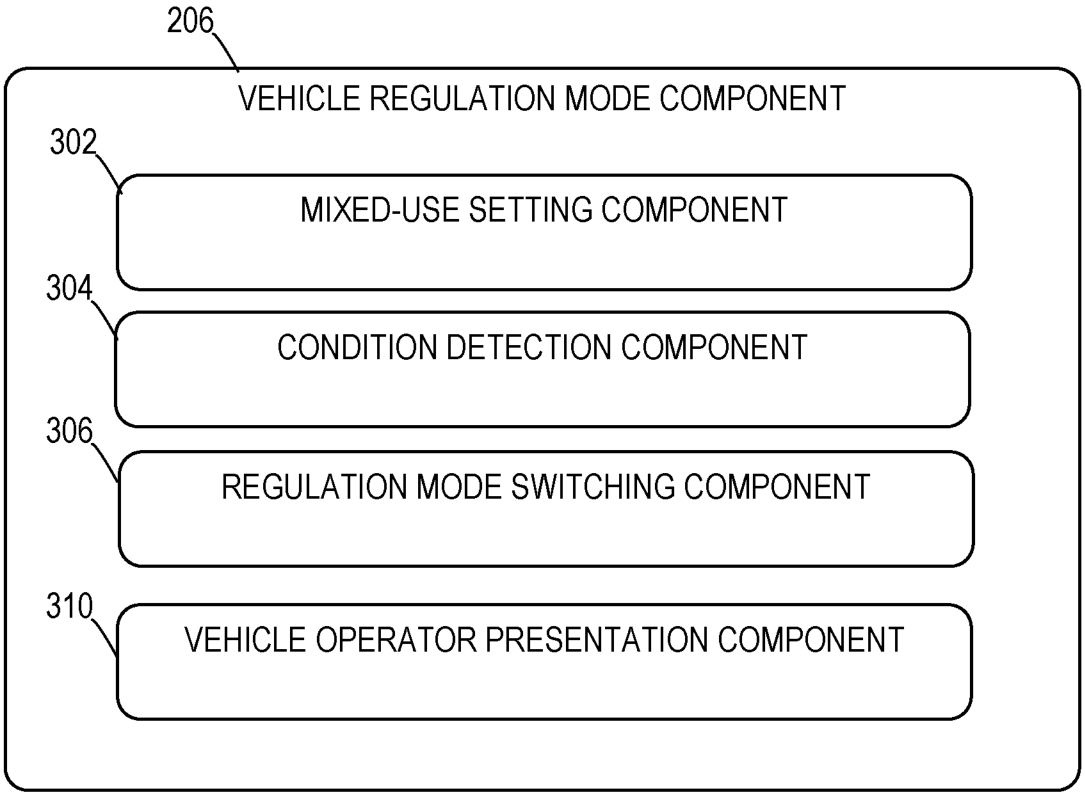
FIG. 3 is a block diagram of the vehicle regulation mode component, according to some example embodiments.

As shown in FIG. 3, the vehicle regulation mode component 206 of FIG. 2 may include a mixed-use setting component 302, a condition detection component 304, a regulation mode switching component 306, and a vehicle operator presentation component 310.

The mixed-use setting component 302 can present a UI to a fleet manager through which the fleet manager activates or enables mixed-use settings for certain drivers, vehicles 102 of FIG. 1, and/or users. The mixed-use setting component 302 stores the mixed-use setting in a profile for the specified drivers, vehicles 102, and/or users. The mixed-use setting component 302 allows a vehicle 102 and/or driver to switch between operating the vehicle automatically or manually 102 in a first vehicle regulation mode to a second vehicle regulation mode when certain conditions are met. This provides more flexibility to drivers to use vehicles 102 in different scenarios that do not involve regulated vehicles 102.

For example, a vehicle 102 can, by default, operate in the unregulated vehicle regulation mode. The vehicle 102 can access the mixed-use setting component 302 to determine that the vehicle 102 is enabled for mixed-use. Any operations performed in the vehicle 102, with respect to switching vehicle regulation modes, can be performed in the alternative or additionally by the client device 104 of FIG. 1 of a given driver or user of the vehicle 102.

In response to determining that the vehicle 102 is associated with an enabled mixed-use setting, the condition detection component 304 monitors for one or more conditions for switching from a first vehicle regulation mode to a second vehicle regulation mode. For example, the condition detection component 304 can communicate with the vehicle operator presentation component 310 to present a user interface to a driver. The user interface can present an indicator of the current vehicle regulation mode that is active for the driver and/or vehicle 102. The condition detection component 304 can detect an interaction with the UI that selects the current vehicle regulation mode indicator that is presented. In response to the interaction, the condition detection component 304 can instruct the vehicle operator presentation component 310 to present a UI with a display that presents HOS for the driver.

Figure 5:
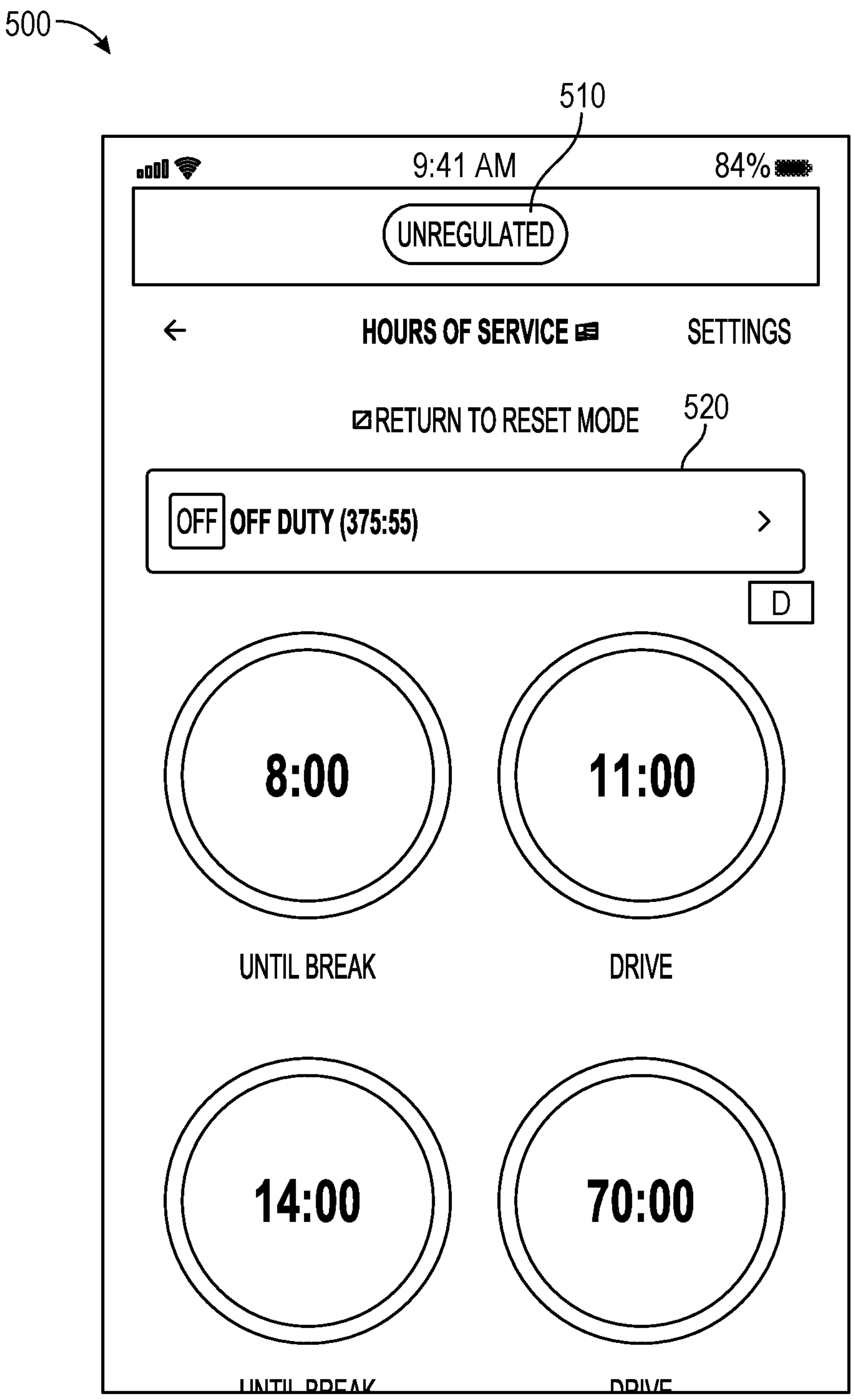
FIGS. 5-7 are example user interfaces for operating a vehicle in one of multiple vehicle regulation modes, according to some example embodiments.

For example, the vehicle operator presentation component 310 can present the user interface 500, shown in FIG. 5. The user interface 500 can include the indicator 510 of the current vehicle regulation mode that is active. The user interface 500 can present an HOS region 520 that displays how many hours are left for the driver to drive, to take a break, and so forth. The vehicle operator presentation component 310 can detect input that selects the indicator 510. In response, the vehicle operator presentation component 310 indicates to the condition detection component 304 that a request to switch modes has been received. The condition detection component 304 can instruct the vehicle operator presentation component 310 to present a set of options for switching between vehicle regulation modes.

Figure 6:
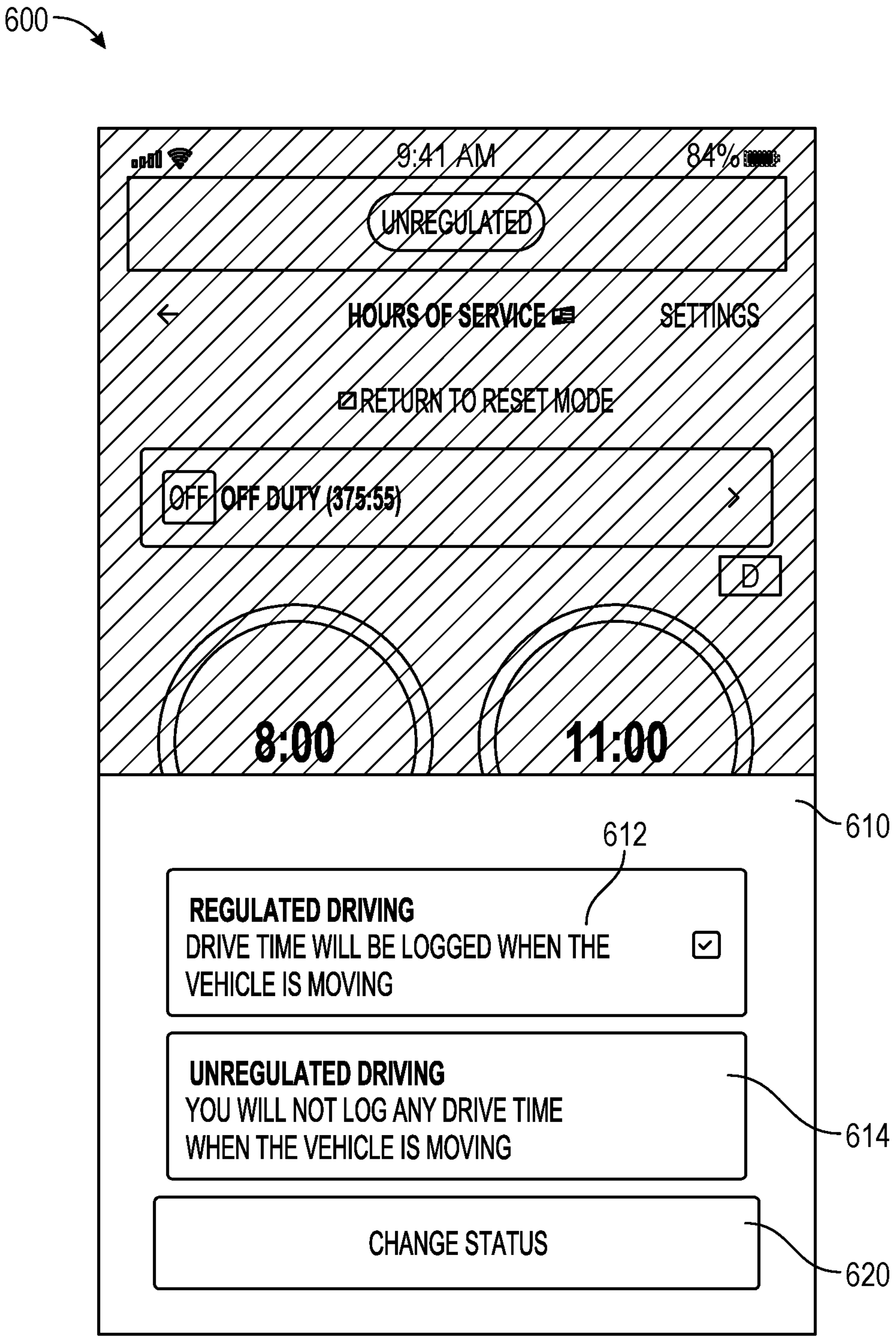

For example, the vehicle operator presentation component 310, in response to the input that selects the indicator 510, presents a user interface 600 (FIG. 6) with a vehicle regulation mode selection window 610. The vehicle regulation mode selection window 610 can include a set of options of different vehicle regulation modes. For example, the vehicle regulation mode selection window 610 can include a regulated driving vehicle regulation mode option 612 and an unregulated driving vehicle regulation mode option 614. The vehicle operator presentation component 310 can present an indicator (e.g., a checkmark) that identifies the current one of the vehicle regulation modes that is active. In this case, the vehicle operator presentation component 310 determines that the regulated driving vehicle regulation mode is active and, in response, presents the checkmark in association with the regulated driving vehicle regulation mode option 612. The vehicle operator presentation component 310 can detect input that selects the unregulated driving vehicle regulation mode option 614. The vehicle operator presentation component 310 can move the checkmark to the selected unregulated driving vehicle regulation mode option 614. In response to receiving input that selects a change status option 620, the vehicle operator presentation component 310 sends a message to the condition detection component 304 that identifies the newly selected vehicle regulation mode.

The condition detection component 304, in response to receiving the message from the vehicle operator presentation component 310, instructs the regulation mode switching component 306 to perform a set of operations associated with the newly selected vehicle regulation mode (e.g., the unregulated driving mode) instead of the currently active vehicle regulation mode (e.g., the regulated driving mode). The regulation mode switching component 306 switches the currently active vehicle regulation mode to the selected vehicle regulation mode. In response to determining that the previous vehicle regulation mode was associated with collecting ELD data and that the newly selected and activated mode is not associated with collecting ELD data, the regulation mode switching component 306 can instruct the route tracking report generation component 208 to stop recording ELD data associated with the vehicle 102. The regulation mode switching component 306 can also store a timestamp in the route tracking report that when the vehicle regulation mode has been switched.

Figure 7:
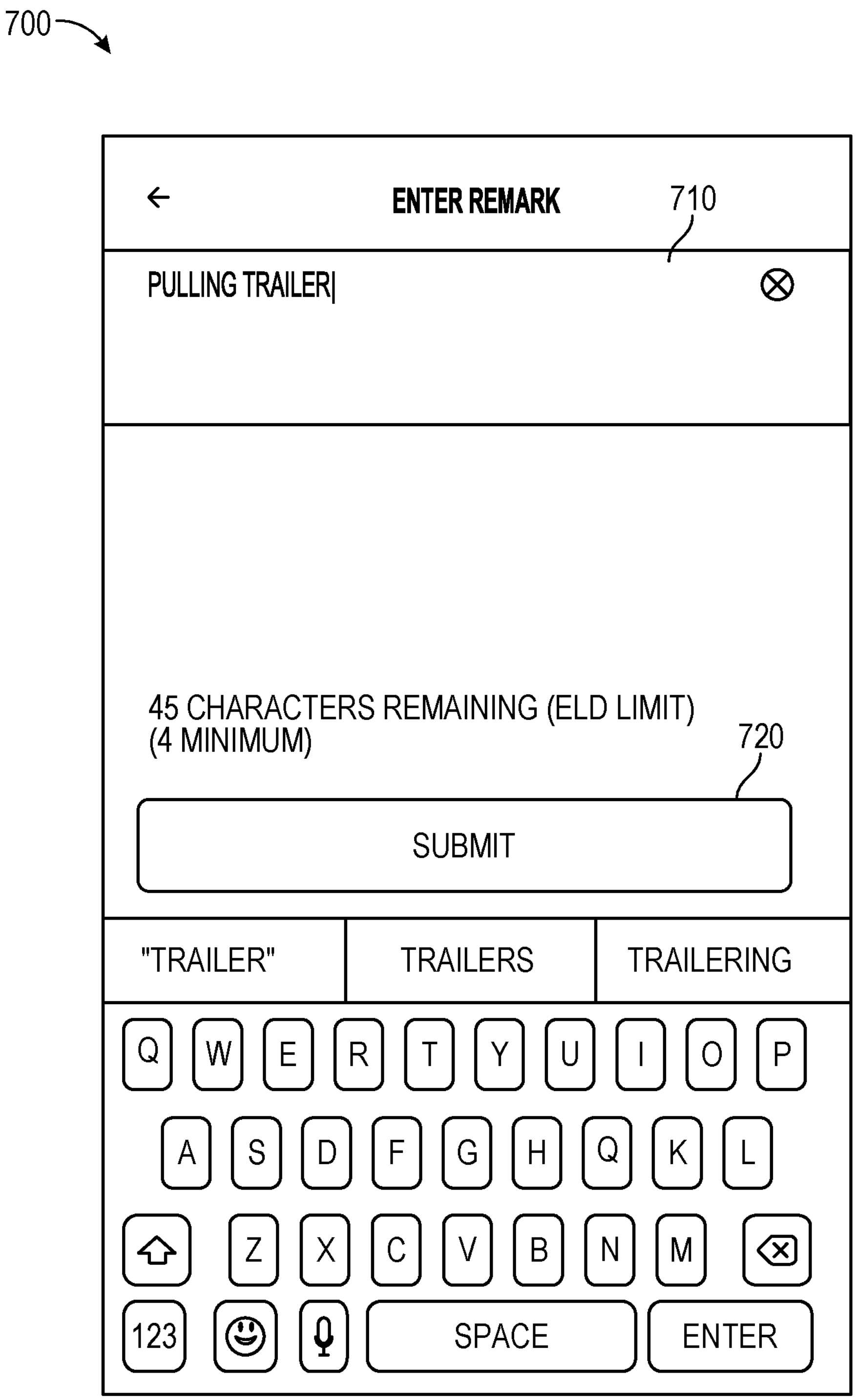

In some examples, the regulation mode switching component 306 can communicate with the vehicle operator presentation component 310 to request input from the driver including an annotation that specifies a reason for switching vehicle regulation modes. In such cases, the vehicle operator presentation component 310 can present a user interface 700, shown in FIG. 7, that includes an annotation region 710. The user interface 700 can receive input from the driver that types in or records verbally a reason for switching the vehicle regulation modes in the annotation region 710. In response to receiving input that selects the submit option 720, the vehicle operator presentation component 310 stores the annotation included in the annotation region 710 and sends a message to the regulation mode switching component 306 that includes the annotation. The regulation mode switching component 306 can instruct the route tracking report generation component 208 to store the annotation in association with the timestamp representing when the vehicle regulation mode has been switched.

In some cases, the condition detection component 304 can receive one or more measurements or information associated with the vehicle 102. The condition detection component 304 can access a set of criteria that is associated with activation of a regulated driving vehicle regulation mode. In response to determining that one or more of the measurements or information corresponds to the set of criteria, the condition detection component 304 can determine that a condition for switching to a regulated driving vehicle regulation mode is met. In such cases, the condition detection component 304 can communicate an instruction to the regulation mode, switching component 306 to switch to the regulated driving vehicle regulation mode. The regulation mode switching component 306 can determine the currently active vehicle regulation mode. In response to determining that the currently active vehicle regulation mode is the regulated driving vehicle regulation mode, the regulation mode switching component 306 may not perform additional operations. In response to determining that the currently active vehicle regulation mode is not the regulated driving vehicle regulation mode, the regulation mode switching component 306 may perform a set of operations to switch operation modes automatically or manually.

For example, the regulation mode switching component 306 can automatically activate an ELD and begin collecting data from the ELD to store as part of the route tracking report. The regulation mode switching component 306 also stores a timestamp in the route tracking report identifying the time when the vehicle regulation mode has been switched. The regulation mode switching component 306 may also access the set of criteria that was met which caused the operating mode to switch and can store, together with the timestamp, information that identifies the set of criteria. For example, the set of criteria includes a weight of the vehicle 102 transgressing or exceeding a weight threshold. In such cases, the regulation mode switching component 306 stores an overweight indicator together with the timestamp that identifies the time when the vehicle regulation mode was switched. As another example, the set of criteria includes a passenger count of the vehicle 102 transgressing or exceeding a passenger count threshold. In such cases, the regulation mode switching component 306 stores a passenger count indicator together with the timestamp that identifies the time when the vehicle regulation mode was switched. As another example, the set of criteria includes a cargo type of the vehicle 102 corresponding to one or more cargo types. In such cases, the regulation mode switching component 306 stores a cargo type indicator together with the timestamp that identifies the time when the vehicle regulation mode was switched.

In some examples, instead of automatically switching the operating modes, the regulation mode switching component 306 can generate a prompt for display to a driver. The prompt can indicate the one or more criteria that has been satisfied for switching to the regulated driving mode. The prompt can receive input from the driver confirming the switch from the unregulated driving mode to the regulated driving mode. In response to the input, the regulation mode switching component 306 activates an ELD and begin collecting data from the ELD to store as part of the route tracking report and stores the annotation representing the reason for the switch.

Figure 4:
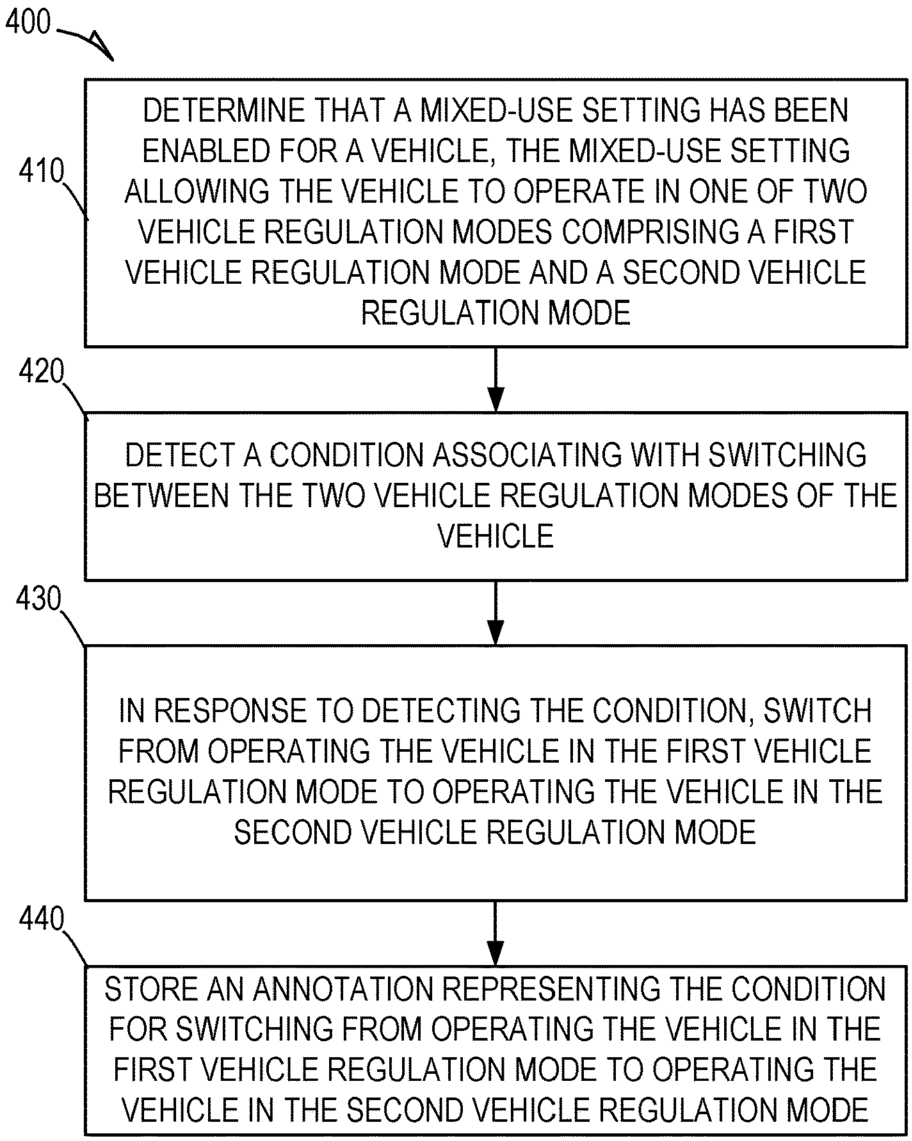
FIG. 4 is a flowchart showing a process for operating a vehicle in one of multiple vehicle regulation modes, according to some example embodiments.

FIG. 4 is a flowchart showing a process 400 for manually starting assigned routes, according to some example embodiments. The process 400 may be embodied in computer-readable instructions for execution by one or more processors such that the operations of the process 400 may be performed in part or in whole by the route management system 106 of FIG. 1; accordingly, the process 400 is described below by way of example with reference thereto. However, it shall be appreciated that at least some of the operations of the process 400 may be deployed on various other hardware configurations and the process 400 is not intended to be limited to the route management system 106.

At operation 410, the route management system 106 determines that a mixed-use setting has been enabled for a vehicle, the mixed-use setting allowing the vehicle to operate in one of two vehicle regulation modes comprising a first vehicle regulation mode and a second vehicle regulation mode, as discussed above.

At operation 420, the route management system 106 detects a condition associating with switching between the two vehicle regulation modes of the vehicle, as discussed above.

At operation 430, the route management system 106, in response to detecting the condition, switches from operating the vehicle in the first vehicle regulation mode to operating the vehicle in the second vehicle regulation mode, as discussed above.

At operation 440, the route management system 106 stores an annotation representing the condition for switching from operating the vehicle in the first vehicle regulation mode to operating the vehicle in the second vehicle regulation mode, as discussed above.

Software Architecture

Figure 8:
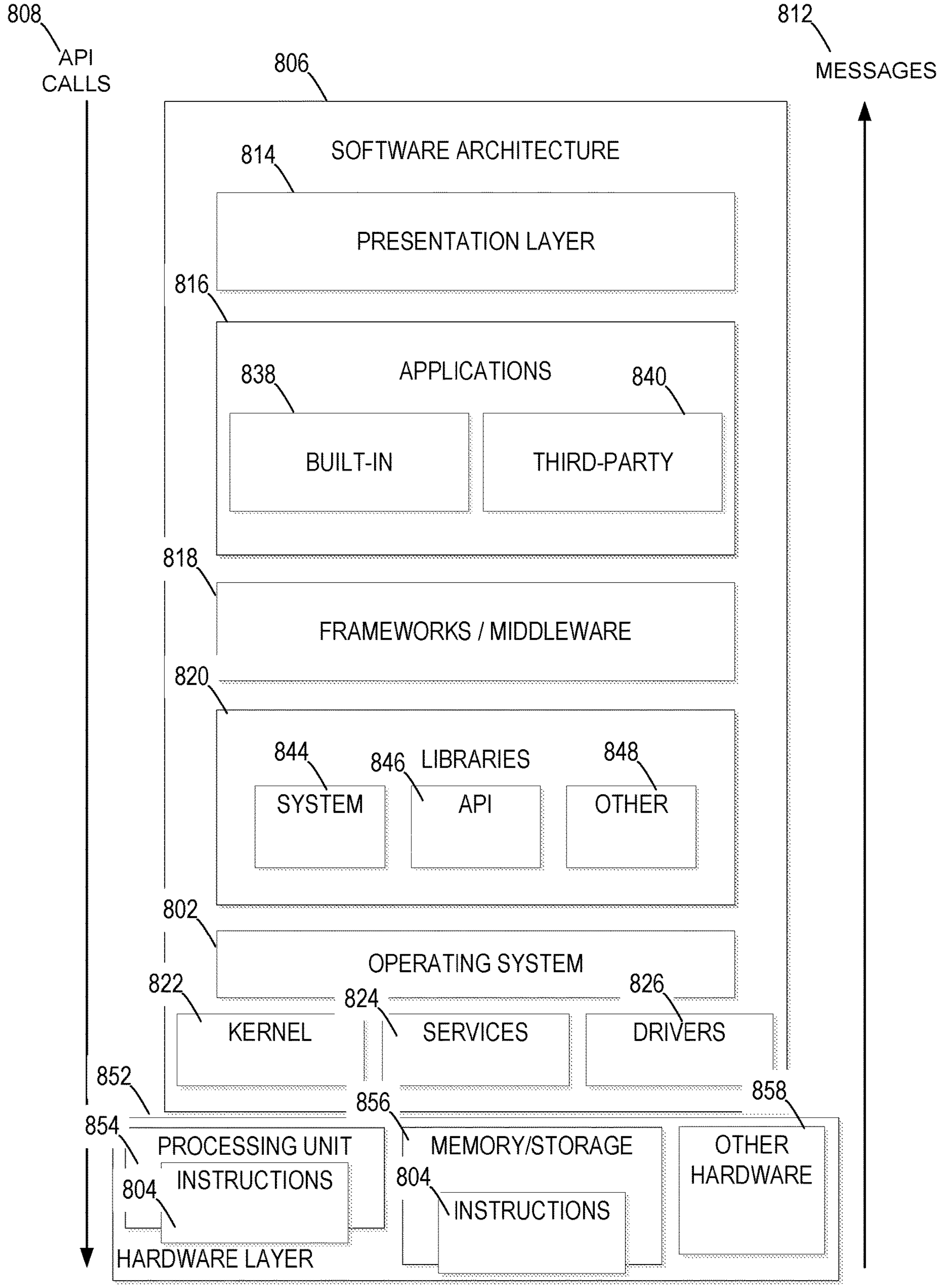
FIG. 8 is a block diagram illustrating an example software architecture, which may be used in conjunction with various hardware architectures herein described.

FIG. 8 is a block diagram illustrating an example software architecture 806, which may be used in conjunction with various hardware architectures herein described. FIG. 8 is a non-limiting example of a software architecture 806 and it will be appreciated that many other architectures may be implemented to facilitate the functionality described herein. The software architecture 806 may execute on hardware such as machine 900 of FIG. 9 that includes, among other things, processors 904, memory 914, and (input/output) I/O components 918. A representative hardware layer 852 is illustrated and can represent, for example, the machine 900 of FIG. 9. The representative hardware layer 852 includes a processing unit 854 having associated executable instructions 804. Executable instructions 804 represent the executable instructions of the software architecture 806, including implementation of the methods, components, and so forth described herein. The hardware layer 852 also includes memory and/or storage modules 856, which also have executable instructions 804. The hardware layer 852 may also comprise other hardware 858.

In the example architecture of FIG. 8, the software architecture 806 may be conceptualized as a stack of layers where each layer provides particular functionality. For example, the software architecture 806 may include layers such as an operating system 802, libraries 820, frameworks/middleware 818, applications 816, and a presentation layer 814. Operationally, the applications 816 and/or other components within the layers may invoke application programming interface (API) calls 808 through the software stack and receive a response such as messages 812 in response to the API calls 808. The layers illustrated are representative in nature and not all software architectures have all layers. For example, some mobile or special purpose operating systems may not provide a frameworks/middleware 818, while others may provide such a layer. Other software architectures may include additional or different layers.

The operating system 802 may manage hardware resources and provide common services. The operating system 802 may include, for example, a kernel 822, services 824, and drivers 826. The kernel 822 may act as an abstraction layer between the hardware and the other software layers. For example, the kernel 822 may be responsible for memory management, processor management (e.g., scheduling), component management, networking, security settings, and so on. The services 824 may provide other common services for the other software layers. The drivers 826 are responsible for controlling or interfacing with the underlying hardware. For instance, the drivers 826 include display drivers, camera drivers, Bluetooth® drivers, flash memory drivers, serial communication drivers (e.g., Universal Serial Bus (USB) drivers), Wi-Fi® drivers, audio drivers, power management drivers, and so forth, depending on the hardware configuration.

The libraries 820 provide a common infrastructure that is used by the applications 816 and/or other components and/or layers. The libraries 820 provide functionality that allows other software components to perform tasks in an easier fashion than to interface directly with the underlying operating system 802 functionality (e.g., kernel 822, services 824, and/or drivers 826). The libraries 820 may include system libraries 844 (e.g., C standard library) that may provide functions such as memory allocation functions, string manipulation functions, mathematical functions, and the like. In addition, the libraries 820 may include API libraries 846 such as media libraries (e.g., libraries to support presentation and manipulation of various media format such as MPEG4, H.264, MP3, AAC, AMR, JPG, PNG), graphics libraries (e.g., an OpenGL framework that may be used to render 2D and 3D in a graphic content on a display), database libraries (e.g., SQLite that may provide various relational database functions), web libraries (e.g., WebKit that may provide web browsing functionality), and the like. The libraries 820 may also include a wide variety of other libraries 848 to provide many other APIs to the applications 816 and other software components/modules.

The frameworks/middleware 818 (also sometimes referred to as middleware) provide a higher-level common infrastructure that may be used by the applications 816 and/or other software components/modules. For example, the frameworks/middleware 818 may provide various graphical user interface (GUI) functions, high-level resource management, high-level location services, and so forth. The frameworks/middleware 818 may provide a broad spectrum of other APIs that may be used by the applications 816 and/or other software components/modules, some of which may be specific to a particular operating system 802 or platform.

The applications 816 include built-in applications 838 and/or third-party applications 840. Examples of representative built-in applications 838 may include, but are not limited to, a contacts application, a browser application, a book reader application, a location application, a media application, a messaging application, and/or a game application. Third-party applications 840 may include an application developed using the ANDROID™ or IOS™ software development kit (SDK) by an entity other than the vendor of the particular platform, and may be mobile software running on a mobile operating system such as IOS™, ANDROID™, WINDOWS® Phone, or other mobile operating systems. The third-party applications 840 may invoke the API calls 808 provided by the mobile operating system (such as operating system 802) to facilitate functionality described herein.

The applications 816 may use built in operating system functions (e.g., kernel 822, services 824, and/or drivers 826), libraries 820, and frameworks/middleware 818 to create UIs to interact with users of the system. Alternatively, or additionally, in some systems, interactions with a user may occur through a presentation layer, such as presentation layer 814. In these systems, the application/component "logic" can be separated from the aspects of the application/component that interact with a user.

Figure 9:
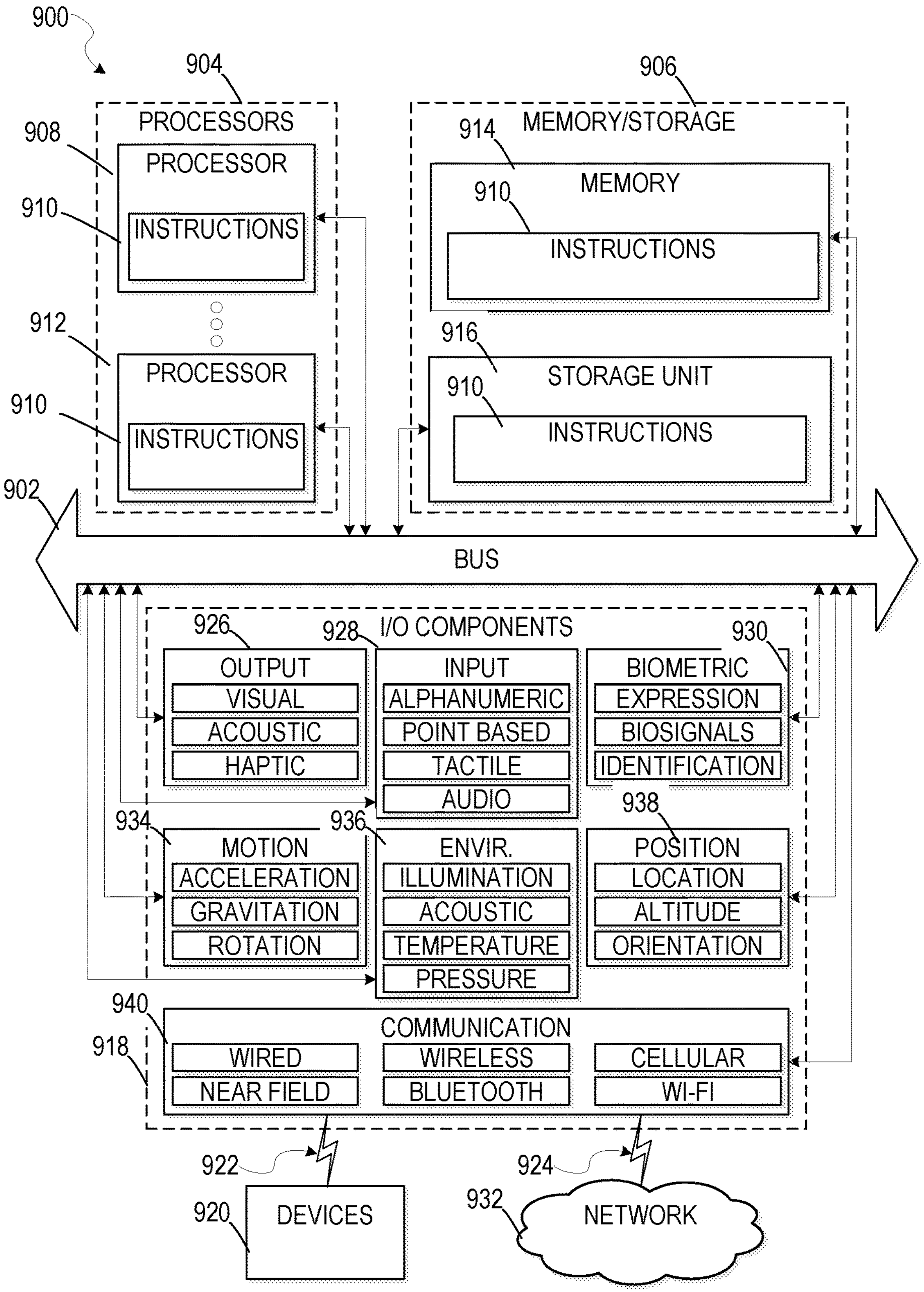
FIG. 9 is a block diagram illustrating components of a machine, according to some example embodiments, able to read instructions from a machine-readable medium (e.g., a machine-readable storage medium) and perform any one or more of the methodologies discussed herein.

FIG. 9 is a block diagram illustrating components of a machine 900, according to some example embodiments, able to read instructions 804 from a machine-readable medium (e.g., a machine-readable storage medium) and perform any one or more of the methodologies discussed herein. Specifically, FIG. 9 shows a diagrammatic representation of the machine 900 in the example form of a computer system, within which instructions 910 (e.g., software, a program, an application, an applet, an app, or other executable code) for causing the machine 900 to perform any one or more of the methodologies discussed herein may be executed. As such, the instructions 910 may be used to implement modules or components described herein. The instructions 910 transform the general, non-programmed machine 900 into a particular machine 900 programmed to carry out the described and illustrated functions in the manner described. In alternative embodiments, the machine 900 operates as a standalone device or may be coupled (e.g., networked) to other machines. In a networked deployment, the machine 900 may operate in the capacity of a server machine or a client machine in a server-client network environment, or as a peer machine in a peer-to-peer (or distributed) network environment. The machine 900 may comprise, but not be limited to, a server computer, a client computer, a PC, a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine 900 capable of executing the instructions 910, sequentially or otherwise, that specify actions to be taken by machine 900. Further, while only a single machine 900 is illustrated, the term "machine" shall also be taken to include a collection of machines that individually or jointly execute the instructions 910 to perform any one or more of the methodologies discussed herein.

The machine 900 may include processors 904, memory/storage 906, and I/O components 918, which may be configured to communicate with each other such as via a bus 902. The memory/storage 906 may include a memory 914, such as a main memory, or other memory storage, and a storage unit 916, both accessible to the processors 904 such as via the bus 902. The storage unit 916 and memory 914 store the instructions 910 embodying any one or more of the methodologies or functions described herein. The instructions 910 may also reside, completely or partially, within the memory 914, within the storage unit 916, within at least one of the processors 904 (e.g., within the processor's cache memory), or any suitable combination thereof, during execution thereof by the machine 900. Accordingly, the memory 914, the storage unit 916, and the memory of processors 904 are examples of machine-readable media.

The I/O components 918 may include a wide variety of components to receive input, provide output, produce output, transmit information, exchange information, capture measurements, and so on. The specific I/O components 918 that are included in a particular machine 900 will depend on the type of machine. For example, portable machines such as mobile phones will likely include a touch input device or other such input mechanisms, while a headless server machine will likely not include such a touch input device. It will be appreciated that the I/O components 918 may include many other components that are not shown in FIG. 9. The I/O components 918 are grouped according to functionality merely for simplifying the following discussion and the grouping is in no way limiting. In various example embodiments, the I/O components 918 may include output components 926 and input components 928. The output components 926 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 928 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like.

In further example embodiments, the I/O components 918 may include biometric components 930, motion components 934, environmental components 936, or position components 938 among a wide array of other components. For example, the biometric components 930 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 934 may include acceleration sensor components (e.g., accelerometer), gravitation sensor components, rotation sensor components (e.g., gyroscope), and so forth. The environmental components 936 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 938 may include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 918 may include communication components 940 operable to couple the machine 900 to a network 932 or devices 920 via coupling 924 and coupling 922, respectively. For example, the communication components 940 may include a network interface component or other suitable device to interface with the network 932. In further examples, communication components 940 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 920 may be another machine or any of a wide variety of peripheral devices (e.g., a peripheral device coupled via a USB).

Moreover, the communication components 940 may detect identifiers or include components operable to detect identifiers. For example, the communication components 940 may include radio frequency identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 940 such as location via Internet Protocol (IP) geo-location, location via Wi-Fi® signal triangulation, location via detecting a NFC beacon signal that may indicate a particular location, and so forth.

GLOSSARY

"CARRIER SIGNAL" in this context refers to any intangible medium that is capable of storing, encoding, or carrying instructions 910 for execution by the machine 900, and includes digital or analog communications signals or other intangible medium to facilitate communication of such instructions 910. Instructions 910 may be transmitted or received over the network 932 using a transmission medium via a network interface device and using any one of a number of well-known transfer protocols.

"CLIENT DEVICE" in this context refers to any machine 900 that interfaces to a communications network 932 to obtain resources from one or more server systems or other client devices. A client device may be, but is not limited to, mobile phones, desktop computers, laptops, PDAs, smart phones, tablets, ultra books, netbooks, laptops, multi-processor systems, microprocessor-based or programmable consumer electronics, game consoles, STBs, or any other communication device that a user may use to access a network 932.

"COMMUNICATIONS NETWORK" in this context refers to one or more portions of a network 932 that may be an ad hoc network, an intranet, an extranet, a virtual private network (VPN), a LAN, a wireless LAN (WLAN), a WAN, a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network 932 or a portion of a network 932 may include a wireless or cellular network and the coupling may be a Code Division Multiple Access (CDMA) connection, a Global System for Mobile communications (GSM) connection, or other type of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

"MACHINE-READABLE MEDIUM" in this context refers to a component, device, or other tangible media able to store instructions 910 and data temporarily or permanently and may include, but is not limited to, random-access memory (RAM), read-only memory (ROM), buffer memory, flash memory, optical media, magnetic media, cache memory, other types of storage (e.g., erasable programmable read-only memory (EEPROM)), and/or any suitable combination thereof. The term "machine-readable medium" should be taken to include a single medium or multiple media (e.g., a centralized or distributed database, or associated caches and servers) able to store instructions 910. The term "machine-readable medium" shall also be taken to include any medium, or combination of multiple media, that is capable of storing instructions 910 (e.g., code) for execution by a machine 900, such that the instructions 910, when executed by one or more processors 904 of the machine 900, cause the machine 900 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

"COMPONENT" in this context refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor or a group of processors 904) may be configured by software (e.g., an application 816 or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application specific integrated circuit (ASIC). A hardware component may also include programmable logic or circuitry that is temporarily configured by software to perform certain operations. For example, a hardware component may include software executed by a general-purpose processor 904 or other programmable processors 904. Once configured by such software, hardware components become specific machines 900 (or specific components of a machine 900), uniquely tailored to perform the configured functions and are no longer general-purpose processors 904. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose processor 904 configured by software to become a special-purpose processor, the general-purpose processor 904 may be configured as respectively different special-purpose processors (e.g., comprising different hardware components) at different times. Software accordingly configures a particular processor or processors 904, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses 902) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors 904 that are temporarily configured (e.g., by software) or permanently configured to perform the relevant operations. Whether temporarily or permanently configured, such processors 904 may constitute processor-implemented components that operate to perform one or more operations or functions described herein. As used herein, "processor-implemented component" refers to a hardware component implemented using one or more processors 904. Similarly, the methods described herein may be at least partially processor-implemented, with a particular processor or processors 904 being an example of hardware. For example, at least some of the operations of a method may be performed by one or more processors 904 or processor-implemented components. Moreover, the one or more processors 904 may also operate to support performance of the relevant operations in a "cloud computing" environment or as a "software as a service" (SaaS). For example, at least some of the operations may be performed by a group of computers (as examples of machines 900 including processors 904), with these operations being accessible via a network 932 (e.g., the Internet) and via one or more appropriate interfaces (e.g., an API). The performance of certain of the operations may be distributed among the processors 904, not only residing within a single machine 900, but deployed across a number of machines 900. In some example embodiments, the processors 904 or processor-implemented components may be located in a single geographic location (e.g., within a home environment, an office environment, or a server farm). In other example embodiments, the processors 904 or processor-implemented components may be distributed across a number of geographic locations.

"PROCESSOR" in this context refers to any circuit or virtual circuit (a physical circuit emulated by logic executing on an actual processor 904) that manipulates data values according to control signals (e.g., "commands," "op codes," "machine code," etc.) and which produces corresponding output signals that are applied to operate a machine 900. A processor 904 may be, for example, a central processing unit (CPU), a reduced instruction set computing (RISC) processor, a complex instruction set computing (CISC) processor, a graphics processing unit (GPU), a digital signal processor (DSP), an ASIC, a radio-frequency integrated circuit (RFIC) or any combination thereof. A processor 904 may further be a multi-core processor having two or more independent processors 904 (sometimes referred to as "cores") that may execute instructions 910 contemporaneously.

"TIMESTAMP" in this context refers to a sequence of characters or encoded information identifying when a certain event occurred, for example giving date and time of day, sometimes accurate to a small fraction of a second.

"TIME DELAYED NEURAL NETWORK (TDNN)" in this context is an artificial neural network architecture whose primary purpose is to work on sequential data. An example would be converting continuous audio into a stream of classified phoneme labels for speech recognition.

"BI-DIRECTIONAL LONG-SHORT TERM MEMORY (BLSTM)" in this context refers to a recurrent neural network (RNN) architecture that remembers values over arbitrary intervals. Stored values are not modified as learning proceeds. RNNs allow forward and backward connections between neurons. BLS™ are well-suited for the classification, processing, and prediction of time series, given time lags of unknown size and duration between events.

What is claimed is:

1. A method comprising:

determining, by a route management system, that a mixed-use setting has been enabled for a vehicle that is equipped with an electronic logging device (ELD), the mixed-use setting allowing the vehicle to operate in one of two vehicle regulation modes comprising a first vehicle regulation mode during which a driver of the vehicle is driving the vehicle and a second vehicle regulation mode that is different from the first vehicle regulation mode despite the driver driving the vehicle during the second vehicle regulation mode;

presenting a user interface in the vehicle that comprises an interactive vehicle regulation mode indicator representing a current vehicle regulation mode that is active of the two vehicle regulation modes, the user interface comprising a hours of service (HOS) region that presents how many hours remain for the driver of the vehicle to drive;

receiving input from the driver, via the user interface that is presented in the vehicle, that selects the interactive vehicle regulation mode indicator presented within the user interface;

in response to receiving the input from the driver that selects the interactive vehicle regulation mode indicator from the user interface that is presented in the vehicle, causing a vehicle regulation mode selection window to be presented with the interactive vehicle regulation mode indicator and the HOS region, the vehicle regulation mode selection window comprising a set of options of different vehicle regulation modes comprising the first vehicle regulation mode during which the driver of the vehicle is driving the vehicle and the second vehicle regulation mode during which the driver of the vehicle is driving the vehicle, a visual icon being presented adjacent to one of the set of options corresponding to the current vehicle regulation mode that is active;

receiving location data of the vehicle as the vehicle travels along a route from a beginning geographic location of the route to an ending geographic location of the route with at least one scheduled geographic stop along the route, the location data received from sensors on the vehicle;

detecting a condition associated with switching between the two vehicle regulation modes of the vehicle, the condition including current location data of the vehicle from the received location data that indicates that the vehicle has entered into a region along the route that is associated with the second vehicle regulation mode;

in response to detecting the condition, automatically switching from operating the vehicle in the first vehicle regulation mode during which the driver of the vehicle is driving the vehicle to operating the vehicle in the second vehicle regulation mode during which the driver of the vehicle is driving the vehicle;

in response to automatically switching from operating the vehicle in the first vehicle regulation mode to operating the vehicle in the second vehicle regulation mode, automatically instructing the ELD of the vehicle to log operation of the vehicle while the vehicle is in motion during the second vehicle regulation mode; and storing an annotation representing the condition for switching from operating the vehicle in the first vehicle regulation mode to operating the vehicle in the second vehicle regulation mode.

2. The method of claim 1, wherein the first vehicle regulation mode comprises an unregulated mode of operation and the second vehicle regulation mode comprises a regulated mode of operation, wherein the unregulated mode of operation comprises operation of the vehicle being exempt from following HOS rules, the vehicle having no limit on an amount of time the vehicle is driven in a day, and wherein the regulated mode of operation comprises operation of the vehicle in which the driver needs to follow HOS rules, the driver is subjected to limits on total drive time and shift time in a day, and is associated with automatic logging of drive time by the ELD when the vehicle is in motion.

3. The method of claim 1, further comprising:

causing an additional graphical user interface to be presented; and receiving an additional input from the driver that includes the annotation in the additional graphical user interface-.

4. The method of claim 3, further comprising:

enabling the driver to input the additional input that comprises a reason for switching between the two vehicle regulation modes via the additional graphical user interface.

5. The method of claim 4, further comprising:

automatically populating the annotation presented in the additional graphical user interface.

6. The method of claim 1, wherein detecting the condition comprises determining that the driver has signed out of the route management system, wherein the vehicle is automatically switched to operating in the first vehicle regulation mode in response to determining that the driver has signed out of the route management system.

7. The method of claim 1, further comprising storing a timestamp in a route tracking report indicating when the vehicle was automatically switched from operating in the first vehicle regulation mode to operating in the second vehicle regulation mode-.

8. The method of claim 1, further comprising automatically activating the ELD in response to switching from operating the vehicle in the first vehicle regulation mode to operating the vehicle in the second vehicle regulation mode.

9. The method of claim 1, further comprising:

accessing data associated with the vehicle; and determining that the data satisfies one or more criteria, wherein the condition is detected in response to determining that the data satisfies one or more criteria.

10. The method of claim 1, further comprising:

comparing a current passenger count to a passenger count threshold; and in response to determining that the current passenger count exceeds the passenger count threshold, triggering the ELD to log operation of the vehicle while the vehicle is in motion.

11. The method of claim 9, wherein the data represents a current weight of the vehicle, further comprising:

comparing the current weight of the vehicle to a vehicle weight threshold; and determining that the data satisfies the one or more criteria in response to determining that the current weight of the vehicle transgresses the vehicle weight threshold.

12. The method of claim 9, wherein the data represents a cargo type of the vehicle, further comprising:

determining that the data satisfies the one or more criteria in response to determining that the cargo type of the vehicle corresponds to restricted cargo types.

13. The method of claim 12, wherein the restricted cargo types comprise hazardous materials.

14. The method of claim 1, further comprising automatically storing ELD data in response to switching from operating the vehicle in the first vehicle regulation mode to operating the vehicle in the second vehicle regulation mode.

15. The method of claim 14, further comprising:

after switching from operating the vehicle in the first vehicle regulation mode to operating the vehicle in the second vehicle regulation mode, switching from operating the vehicle in the second vehicle regulation mode to operating the vehicle again in the first vehicle regulation mode, wherein the data from the ELD stops being stored in response to switching from operating the vehicle in the second vehicle regulation mode to operating the vehicle in the first vehicle regulation mode.

16. The method of claim 14, wherein the annotation is stored together with the ELD data, further comprising generating an activity log representing times when the vehicle regulation mode has been switched.

17. The method of claim 1, further comprising receiving input from an administrator that enables the mixed-use setting for the vehicle via a graphical user interface presented to the administrator.

18. A route management system comprising:

one or more computer processors; and one or more computer-readable mediums storing instructions that, when executed by the one or more computer processors, cause the route management system to perform operations comprising:

determining, by the route management system, that a mixed-use setting has been enabled for a vehicle that is equipped with an electronic logging device (ELD), the mixed-use setting allowing the vehicle to operate in one of two vehicle regulation modes comprising a first vehicle regulation mode during which a driver of the vehicle is driving the vehicle and a second vehicle regulation mode that is different from the first vehicle regulation mode despite the driver driving the vehicle during the second vehicle regulation mode;

presenting a user interface in the vehicle that comprises an interactive vehicle regulation mode indicator representing a current vehicle regulation mode that is active of the two vehicle regulation modes, the user interface comprising a hours of service (HOS) region that presents how many hours remain for the driver of the vehicle to drive;

receiving input from the driver, via the user interface that is presented in the vehicle, that selects the interactive vehicle regulation mode indicator presented within the user interface;

in response to receiving the input from the driver that selects the interactive vehicle regulation mode indicator from the user interface that is presented in the vehicle, causing a vehicle regulation mode selection window to be presented with the interactive vehicle regulation mode indicator and the HOS region, the vehicle regulation mode selection window comprising a set of options of different vehicle regulation modes comprising the first vehicle regulation mode during which the driver of the vehicle is driving the vehicle and the second vehicle regulation mode during which the driver of the vehicle is driving the vehicle, a visual icon being presented adjacent to one of the set of options corresponding to the current vehicle regulation mode that is active;

receiving, by the route management system, location data of the vehicle as the vehicle travels along a route from a beginning geographic location of the route to an ending geographic location of the route with at least one scheduled geographic stop along the route, the location data received from sensors on the vehicle;

detecting a condition associated with switching between the two vehicle regulation modes of the vehicle, the condition including current location data of the vehicle from the received location data that indicates that the vehicle has entered into a region along the route that is associated with in response to receiving additional input, from the driver, that selects an individual option from the set of options corresponding to the second vehicle regulation mode;

in response to detecting the condition, automatically switching from operating the vehicle in the first vehicle regulation mode during which the driver of the vehicle is driving the vehicle to operating the vehicle in the second vehicle regulation mode during which the driver of the vehicle is driving the vehicle;

in response to automatically switching from operating the vehicle in the first vehicle regulation mode to operating the vehicle in the second vehicle regulation mode, automatically instructing the ELD of the vehicle to log operation of the vehicle while the vehicle is in motion during the second vehicle regulation mode; and storing an annotation representing the condition for switching from operating the vehicle in the first vehicle regulation mode to operating the vehicle in the second vehicle regulation mode.

19. A non-transitory computer-readable medium storing instructions that, when executed by one or more computer processors of a route management system, cause the route management system to perform operations comprising:

determining, by the route management system, that a mixed-use setting has been enabled for a vehicle that is equipped with an electronic logging device (ELD), the mixed-use setting allowing the vehicle to operate in one of two vehicle regulation modes comprising a first vehicle regulation mode during which a driver of the vehicle is driving the vehicle and a second vehicle regulation mode that is different from the first vehicle regulation mode despite the driver driving the vehicle during the second vehicle regulation mode;

presenting a user interface in the vehicle that comprises an interactive vehicle regulation mode indicator representing a current vehicle regulation mode that is active of the two vehicle regulation modes, the user interface comprising a hours of service (HOS) region that presents how many hours remain for the driver of the vehicle to drive;

receiving input from the driver, via the user interface that is presented in the vehicle, that selects the interactive vehicle regulation mode indicator presented within the user interface;

in response to receiving the input from the driver that selects the interactive vehicle regulation mode indicator from the user interface that is presented in the vehicle, causing a vehicle regulation mode selection window to be presented with the interactive vehicle regulation mode indicator and the HOS region, the vehicle regulation mode selection window comprising a set of options of different vehicle regulation modes comprising the first vehicle regulation mode during which the driver of the vehicle is driving the vehicle and the second vehicle regulation mode during which the driver of the vehicle is driving the vehicle, a visual icon being presented adjacent to one of the set of options corresponding to the current vehicle regulation mode that is active;

receiving location data of the vehicle as the vehicle travels along a route from a beginning geographic location of the route to an ending geographic location of the route with at least one scheduled geographic stop along the route, the location data received from sensors on the vehicle;

detecting a condition associated with switching between the two vehicle regulation modes of the vehicle, the condition including current location data of the vehicle from the received location data that indicates that the vehicle has entered into a region along the route that is associated with the second vehicle regulation mode;

in response to detecting the condition, automatically switching from operating the vehicle in the first vehicle regulation mode during which the driver of the vehicle is driving the vehicle to operating the vehicle in the second vehicle regulation mode during which the driver of the vehicle is driving the vehicle;

in response to automatically switching from operating the vehicle in the first vehicle regulation mode to operating the vehicle in the second vehicle regulation mode, automatically instructing the ELD of the vehicle to log operation of the vehicle while the vehicle is in motion during the second vehicle regulation mode; and storing an annotation representing the condition for switching from operating the vehicle in the first vehicle regulation mode to operating the vehicle in the second vehicle regulation mode.

* * * * *